United States Patent [19]

Meyer et al.

[11] 3,917,583

[45] Nov. 4, 1975

[54] 2-SUBSTITUTED CYCLIC AMP DERIVATIVES

[75] Inventors: Rich B. Meyer, Laguna Beach; Dennis A. Shuman, Mission Viejo, both of Calif.

[73] Assignee: ICN Pharmaceuticals, Inc., Irvine, Calif.

[22] Filed: Feb. 7, 1973

[21] Appl. No.: 330,306

Related U.S. Application Data

[63] Continuation-in-part of Ser. No. 277,868, Aug. 4, 1972, which is a continuation-in-part of Ser. No. 255,804, May 22, 1972.

[52] U.S. Cl. .......................... 260/211.5 R; 424/180
[51] Int. Cl.² ...................................... C07H 19/20
[58] Field of Search ........................... 260/211.5 R

[56] References Cited
UNITED STATES PATENTS

| | | |
|---|---|---|
| 3,332,935 | 7/1967 | Yamazaki et al. ............ 260/211.5 R |
| 3,337,528 | 8/1967 | Saito et al. .................... 260/211.5 R |
| 3,364,199 | 1/1968 | Yamazaki et al. ............ 260/211.5 R |
| 3,450,693 | 6/1969 | Suzuki et al. ................. 260/211.5 R |
| 3,454,559 | 7/1969 | Yamazaki et al. ............ 260/211.5 R |
| 3,712,885 | 1/1973 | Weimann et al. ............. 260/211.5 R |

*Primary Examiner*—Johnnie R. Brown
*Attorney, Agent, or Firm*—Lyon & Lyon

[57] ABSTRACT

2-Substituted derivatives of cyclic AMP and a process of making the same are disclosed which are useful to inhibit the enzyme phosphodiesterase, to activate protein kinase and steriodogenesis, and as intermediates in the synthesis process.

11 Claims, No Drawings

2-SUBSTITUTED CYCLIC AMP DERIVATIVES

This application is a continuation-in-part of Ser. No. 277,868, filed Aug. 4, 1972, entitled "5-Amino-4-Substituted Imidazole Nucleotides", which application in turn is a continuation-in-part of Ser. No. 255,804, filed May 22, 1972, entitled "Synthesis of 6-Substituted Nucleotides".

BACKGROUND OF THE INVENTION

As reported by Sutherland et al in "Cyclic AMP", Am. Rev. Biochem. 37, 149 (1968), cyclic adenosine monophosphate (C-AMP) has been established as an intracellular "second messenger", mediating many of the actions of a variety of different hormones. According to this theory, first messenger hormones, such as epinephrine and norepinephrine, influence adenyl cyclase contained at or within cell walls to form intracellularly cyclic AMP from adenosine triphosphate upon receipt of the extra-cellular hormone signal. The formed cyclic AMP in turn functions as a second messenger and stimulates intracellular functions particular to the target cells of the hormone. Cyclic AMP has thus been shown to "activate" protein kinases, which in turn produce physiological effects such as muscle contraction, glycogenolysis, steroidogenesis and lipolysis. A specific example of mediation of steroidogenesis by C-AMP is cellular biosynthesis and excretion of corticosteriods as occasioned by C-AMP formed by adenyl cyclase within the cell walls of the adrenal cortex upon receipt of an extracellular signal carried by the peptide harmone ACTH.

In addition to the foregoing and as representative of the diverse roles played by C-AMP in biological processes can be mentioned implication of C-AMP as a participant in or mediator of the following metabolic reactions or pharmacologic agents: glucagon, vasopressin, lutenizing hormone, thyroid-stimulating hormone, insulin, UDPG-$\alpha$-trans-glucosylase, phosphofructokinase, tryptophan pyrrolase, ketogenesis, amino acid uptake into liver proteins, acetate incorporation into fatty acids and cholesterol of liver, conversion of lactate to glucose (gluconcogenesis), release of amylase, water and ion permeability, sugar transport, acid secretion in the gastric mucosa, platelet aggregation inhibition, catabolite repression, potentiation of antiviral activity of interferon, inhibition of HeLa and strain L cells in culture, and stimulation of antibody production (immunologic mechanism).

The so-called adrenergic effects of many hormones and drugs are also attributed to the intracellular effects of cyclic AMP, whose concentration is controlled by adenyl cyclase and cyclic nucleotide phosphodiesterase. Recent investigations have shown that at least part of the physiological effect of cyclic AMP is a result of the activation of specific protein kinases by cyclic AMP as, for example in neurotubules isolated from the central nervous system.

As a corollary to the increasing recognition of the role played by cyclic AMP, it has been suggested that it be administered in aid of lagging cellular processes. One example is the report that asthma may be caused by a genetic deficiency of adenyl cyclase. A consequence of such deficiency, of course, is a diminished capacity to intracellularly convert ATP to cyclic adenosine monophosphate.

Cyclic AMP is degraded, however in vivo by phosphodiesterase enzymes, which catalyze hydrolysis of the cyclic purine nucleotide to 5'-adenosine monophosphate with a consequent loss of function. It has accordingly been suggested that substituted cyclic AMP analogs, which are more resistant to phosphodiesterase degradation than the naturally occurring cyclic nucleotide but which nevertheless retain the biological activity of the naturally occurring nucleotide might be administered in aid of lagging cellular processes. The availability of such C-AMP analogs, for example, could permit maintenance of desired cyclic nucleotide monophosphate levels at dosages reduced from those required with C-AMP itself. Furthermore, the differing specificity of the phosphodiesterase toward cyclic nucleotides of widely varying structure, could enhance the utility of compounds which exhibit different susceptibilities of diesterases of widely varying specificities.

Sutherland et al., in Circulation 37, 279 (1968) suggest that the pharmacological effects of theophylline are the result of its ability to inhibit the action of phosphodiesterase enzymes. Theophylline has thus been employed in lieu of the adenyl cyclase-stimulating hormones, epinephrine and norepinephrine, as a heart stimulant following cardiac arrest and in refractory asthma cases as a bronchial dilator. Theophylline, however, does not selectively inhibit phosphodiesterase, but rather gives general stimulation to the central nervous system. Accordingly, the use of theophylline can make the recipient nervous and irritable and can also create cardiovascular effects, i.e., rapid beating. By the same token, theophylline is not as potent a phosphodiesterase inhibitor as is desired and consequently has to be used in larger quantities, which, of course, can further the undesirable effects enumerated above.

From the foregoing, it is clear that it would be advantageous to have cyclic AMP analogs which are resistant to phosphodiesterase degradation and capable of inhibiting phosphodiesterase enzymes, especially on a selective basis, and of activating adrenal steriodogenesis and protein kinase. It would also be desirable to provide an efficient and satisfactory synthesis process.

SUMMARY OF THE INVENTION

This invention thus provides compounds of the structure:

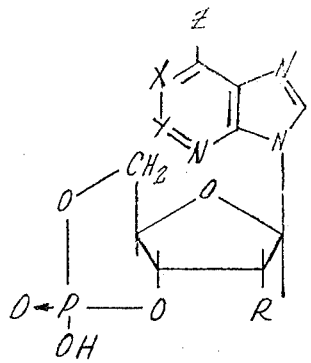

in which X, Y, Z and R are as defined hereinafter, and physiologically acceptable salts thereof, as for example, ammonium, alkali metal or alkyl amine salts. The invention also includes a synthesis process in which 5- amino-4-substituted imidazole nucleotides are subjected to a ring closure treatment.

DETAILED DESCRIPTION OF THE INVENTION

The compounds of the present invention are synthesized by the process depicted in the schematic illustrations which follow, wherein "Rep" implies 1-$\beta$-D-ribofuranosyl3,5-cyclic phosphate. In the generic structural representation set forth above, X may be N or N-oxide, Y may be N or $CR_1$ and Z may be $NH_2$ or OH, as will be understood more clearly from the illustrations and description which follow. In Reaction Scheme A, to which reference is first made, X is N, Y is $CR_1$ and Z is $NH_2$.

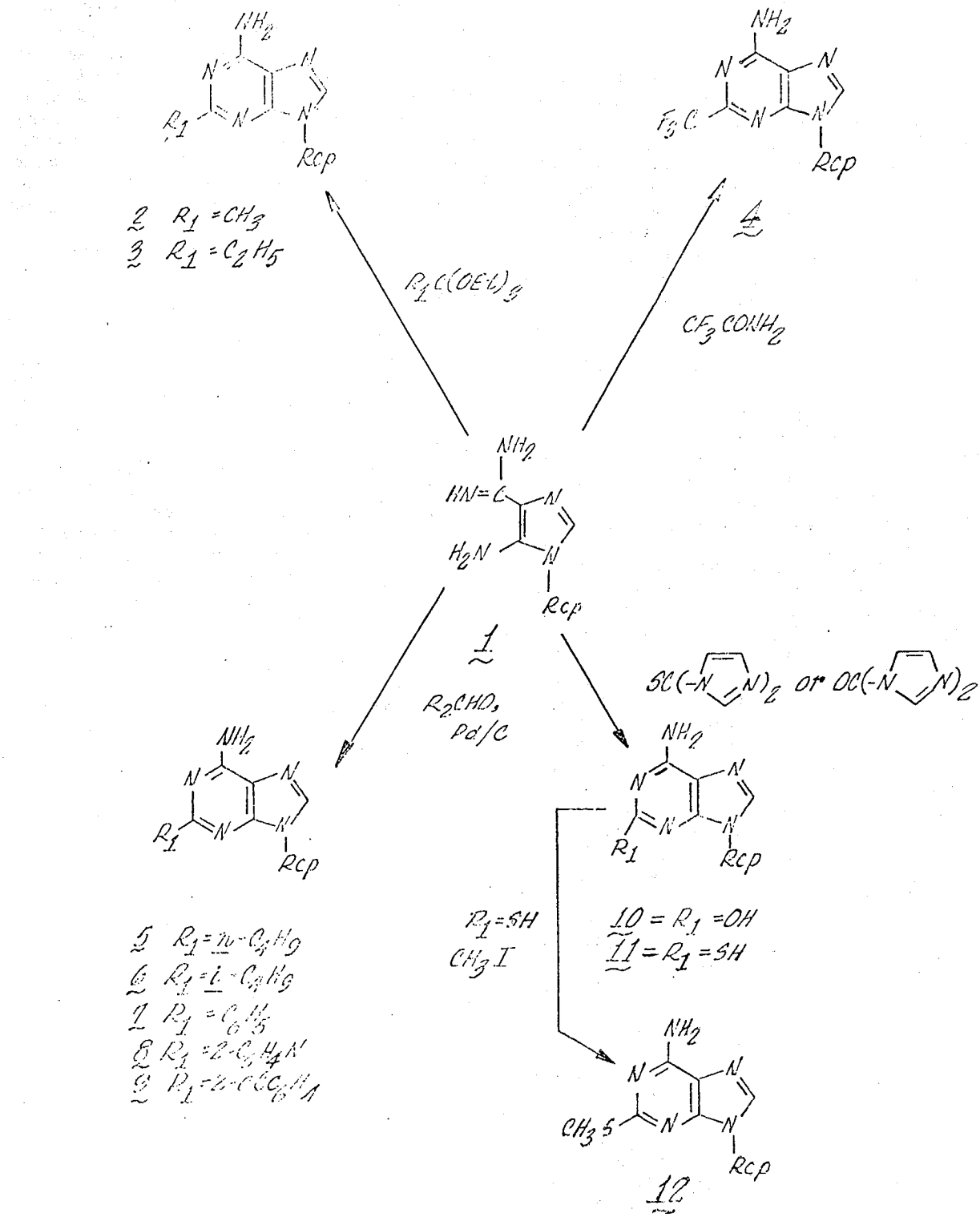

The basic compound used in preparing the compound of this invention is 5-amino-1-$\beta$-D- ribofuranosylimidazole-4-carboxamidine 3',5'-cyclic phosphate (compound 1), which may be prepared as described in our aforenoted application, Ser. No. 277,868, by catalytic hydrogenation of N-alkoxy-5-amino-1-β-D-ribofuranosylimidazole-4-carboxamidine 3',5'-cyclic phosphate. Thus, compound 1 may be subjected to a ring closure treatment with carboxylic acid or carboxaldehyde derivatives. For example, treatment with lower alkyl orthoesters of lower alkyl carboxylic acids at high temperatures (from above 100°C up to the boiling point of the orthoesters, about 130° to about 150°C being optimal) and under anhydrous conditions utilizing a solvent such as DMSO, provides cyclic AMP derivatives with lower alkyl 2-substituents, i.e., triethyl orthoacetate and compound 1 afford 2-methyladenosine 3',5'-cyclic phosphate (compound 2) in 75% yield while triethyl orthopropionate affords a 66% yield of 2-ethyladenosine 3',5' cyclic phosphate (compound 3).

Treatment of compound 1 with carboxamides with strong electron withdrawing substituents on the α carbons, such as trifluoroacetamide, at high temperatures (from about 100°C up to the boiling point of the amide) in a solvent such as tetramethylurea provides acceptable yield of 2-trifluoromethyladenosine 3',5'-cyclic phosphate (compound 4). Other such halogenated acetamides may be reacted with compound 1 to provide the correspond trihalomethyl substituted adenosine 3',5'-cyclic phosphate.

Condensation of compound 1 with various alkyl, aryl, aralkyl and heterocyclic carboxaldehydes provides 2-substituted-2,3-dihydropurine intermediates which are oxidized under mild conditions in situ to give 2-substituted adenine derivatives. Thus, treatment, for example, with n-valderaldehyde for about 5 minutes to about 1 hour in refluxing aqueous alcohol, e.g., methanol, ethanol, etc., containing a catalytic amount of palladium on carbon yields 2-n-butyladenosine 3',5'-cyclic phosphate (compound 5) in approximately 65% yield. Similarly, treatment with isovaleraldehyde under substantially the same conditions yields 2-(2-methyl-1-propyl)adenosine 3',5'-cyclic phosphate (compound 6), treatment with benzaldehyde affords 2-phenyl adenosine 3',5'-cyclic phosphate (compound 7), and treatment with pyridine-2-carboxaldehyde gave 2-(2-pyridyl)adenosine 3',5'-cyclic phosphate (compound 8).

Although palladium on carbon is the preferred catalyst, other catalysts such as platinum or nickel may be used if desired. By the same token, the reaction proceeds in satisfactory manner at lower temperatures, e.g., approximately 25°C, but vigorous reflux conditions are required to liberate absorbed $H_2$ from the catalyst and accordingly, it is preferred to operate the process under refluxing conditions. Also, while water and a base are needed to dissolve compound 1, certain aldehydes are not soluble in water and compound 1 is hydrolyzed by water and base, and thus, an aqueous alcohol is utilized as described.

It is also desirable to operate at room temperature since compound 1 is susceptible to decomposition at the higher temperatures required when utilizing a palladium catalyst. Accordingly, a dehydrogenation reagent such as chloranil or 2,3-dichloro-5,6-dicyanobenzoquinone may be used in place of palladium to provide a reaction product such as compound 9. This process also offers the further advantages of high yields of product and facile isolation of the product, and accordingly represents our preferred mode of synthesis.

This reaction may also be carried out at temperatures other than ambient. The general range of operation is from about 0° to 100°C with a preferred range from about 10° to about 40°C. The reaction is carried out in a mixture of agueous and organic water-miscible solvents, preferably about 1:5 parts of water to organic solvent such as dimentyl formamide (DMF), although, of course, other water-miscible organic solvents may be used if desired.

The 2-hydroxy and 2-thio derivatives are synthesized by reaction of compound 1 with suitably activated derivatives of carbonic or thiocarbonic acid under anhydrous conditions utilizing dimethylsulfoxide (DMSO) for solubility and temperatures on the order of about 0° to about 25°C. Thus, reaction with 1,1'-carbonyl-bis-imidazole yields 2-hydroxyadenosine 3',5'-cyclic phosphate (compound 10) and reaction with thiocarbonyl-bis imidazole under such conditions affords 2-thioadenosine 3',5'-cyclic phosphate (compound 11).

The 2-alkylthio substituted compounds are prepared by alkylation of compound 11 with methyl iodide or other alkyl or aralkyl halide in aqueous sodium hydroxide to provide 2-methylthio (compound 12) or other 2-alkyl or aralkylthioadenosine 3',5'-cyclic phosphate. The reaction is preferably carried out at room temperature for from about 30 minutes to about 1 hour, although temperatures of from about 0° to about 100°C may be used.

Referring now to Reaction Scheme B wherein X is N or N oxide and Y is N, 2-azainosine and azadenosine 3',5'-cyclic phosphates are depicted. Thus, treatment of 5-amino-1-β-D-ribofuranosylimidazole-4-carboxamidine 3',5'-cyclic phosphate (compound 13 where W is NH and hence is compound 1 previously referred to) with sodium nitrite under strongly acidic conditions (e.g., an acid such as HCl at a pH of no more than about 4) at a temperature below 0°C, preferably —25°C, affords 2-azaadenosine 3',5'-cyclic phosphate (compound 14). Similarly, treatment of the 5-amino-1-β-D-ribofuranosylimidazole 3',5'-cyclic phosphates (compounds 13 where W is O or NOH), under the same conditions provides 2-azainosine 3',5'-cyclic phosphate and 2-azaadenosine 3',5'-cyclic phosphate -1-N-oxide respectively.

In the foregoing structural representation of the nucleotides of this invention and as will be more apparent from the illustrative example which follow, X may be N or N-oxide; Y may be N or $CR_1$ where $R_1$ is alkyl, phenyl, 2-pyridyl, trihalomethyl, OH, SH or $SR_2$ where $R_2$ is alkyl or aralkyl; and R may be H, OH or OR' both R' being $C_1$ to $C_{18}$ acyl. Z will only be OH, however, when X and Y are N, and X is N oxide only when Y is N and Z is $NH_2$. The alkyl and aralkyl substituents ($R_1$ and $R_2$) are generally $C_1$ to $C_8$ and preferably $C_1$ to $C_6$.

The invention will be better understood by reference to the following specific but illustrative examples. Parts or percentages, where indicated, are by weight and temperatures are expressed in degrees Centigratde unless specifically indicated otherwise.

REACTION SCHEME B

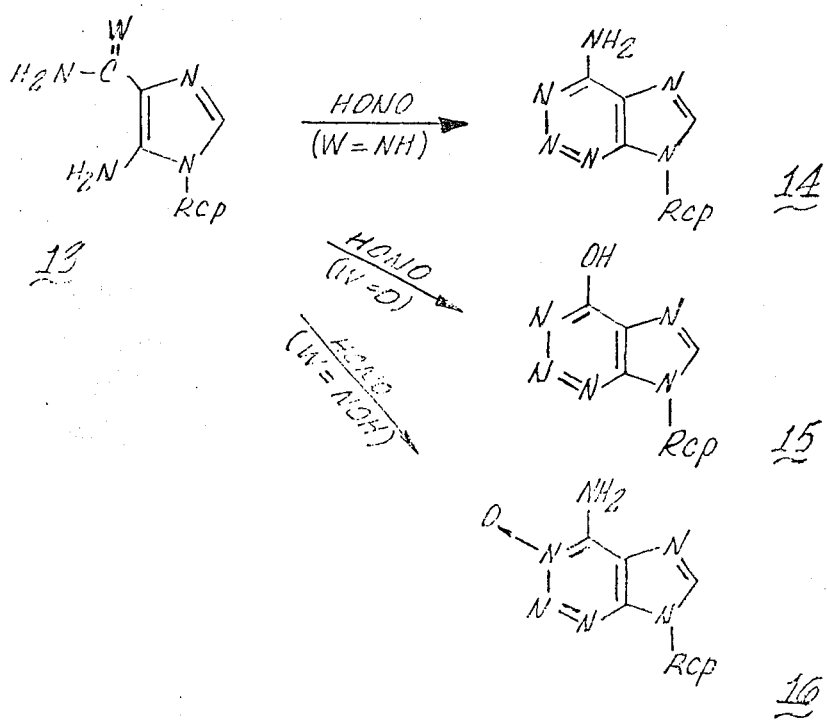

EXAMPLE I

2-Methyladenosine 3′,5′-cyclic phosphate (2)

A mixture of 3.0 g (9.4 mole) of compound 1, 2.0 g (13 mmole) 1,5-diazabicyclo[5,4.0]undec-5-ene (DBU), and 20 ml Me$_2$SO was warmed to solution and 3 ml triethyl orthoacetate was added. The solution was surrounded by an oil bath at 150° and stirred for 45 min. The hot solution was poured into 100 ml H$_2$O and 1 ml formic acid, and this solution was passed through a 2.6 × 20 cm column of Dowex 1 × 2 (formate form, 100–200 mesh). After washing with H$_2$O, the column was eluted with a gradient of 2 L. H$_2$O in the mixing chamber and 2 L. 5N formic acid in the reservoir. Evaporation of the appropriate fractions gave 2.52 g (75%) product.

Anal. Calcd for C$_{11}$H$_{14}$N$_5$O$_6$P·H$_2$O: C, 36.57; H, 4.46; N, 19.39. Found: C, 36.90; H, 4.54; N, 19.69.

EXAMPLE II

2-Ethyladenosine 3′,5′-cyclic phosphate (3)

Treatment of 0.50 g (15.7 mmole) of compound 1 with triethyl orthopropionate as described for the synthesis of compound 2 gave, after the ion-exchange chromatography, 0.390 g (66%) of compound 3.

Anal. Calcd for C$_{12}$H$_{16}$N$_5$O$_6$P·H$_2$O: C, 38.40; H, 4.84; N, 18.66. Found: C, 38.57; H, 4.73; N, 18.77.

EXAMPLE III

2-Trifluoromethyladenosine 3′,5′-cyclic phosphate (4)

A mixture of 1.0 g (3.14 mmole) of compound 1, 0.4 g (3.22 mmole) DBN, and 3.0 g trifluoroacetamide was surrounded by an oil bath at 135° and stirred 30 min. After addition of 5 ml N, N, N′, N′-tetramethylurea the mixture was stirred and heated 4 hr., then poured into 100 ml Et$_2$O. The liquid was decanted, and the residue was taken up in 50 ml H$_2$O and percolated through a 2.6 × 20 ml column of Dowex 50 × 8 (H+, 100–200 mesh) and washed with H$_2$O. The first 500 ml of eluate were evaporated to dryness, and the residue was taken up in 20 ml EtOH. The solution was diluted with 40 ml EtOAc and filtered. On standing, 0.59 g (47%) product was deposited.

Anal. Calcd for C$_{11}$H$_{10}$F$_3$N$_5$O$_6$P: C, 33.34; H, 2.54; F, 14.39; N, 17.68. Found: C, 33.31; H, 2.71; F, 14.67; N, 17.45.

EXAMPLE IV 2-n-Butyladenosine 3′,5′-cyclic phosphate (5)

A mixture of 4.0 g (12.5 mmole) of compound 1, 2.0 g DBU (13.0 mmole), 30 ml H$_2$O, and 40 ml EtOH was brought to solution by refluxing 5 min. Following addition of 0.50 g 10% Pd/C, a solution of 3.0 ml (28.2 mmole) n-valeraldehyde in 25 ml EtOH was added under reflux. After an additional 1 hr. reflux, the mixture was filtered and the filtrate was evaporated. The residue was taken up in MeOH, filtered, and the filtrate was evaporated. The residue was taken up in MeOH, filtered, and again evaporated. The residue was taken up in 200 ml H$_2$O and passed through a 16 × 4 cm column of Dowex 1 × 2 (formate form, 100–200 mesh). After washing with H$_2$O, the column was eluted with a gradient of 2 L. H$_2$O in the mixing chamber and 2 L. 3N formic acid in the reservoir; 23 ml fractions were collected. Evaporation of the fractions (47–85) containing the product gave a residue which crystallized upon addition of EtOH; yield, 3.35 g (65%).

Anal. Calcd for $C_{14}H_{20}N_5O_6P \cdot 1.5H_2O$: C, 40.78; H, 5.62; N, 16.99. Found: C, 41.05; H, 5.68; H, 17.08.

EXAMPLE V 2-(2-Methyl-1-propyl)adenosine 3',5'-Cyclic Phosphate (6)

Two ml isovaleraldehyde were added dropwise to a refluxing mixture of 3.2 g (10 mmole) of compound 1, 1.60 g (10.4 mmole) DBU, 15 ml EtOH, 15 ml $H_2O$, and 0.5 g 10% Pd/C. After 1 hr. of additional reflux, the mixture has worked up as in Example IV, giving 2.18 g (54%).

Anal. Calcd for $C_{14}H_{20}N_5O_6P \cdot H_2O$: C, 41.69; H, 5.50; N, 17.37. Found: C, 41.68; H, 5.65; N, 17.64.

EXAMPLE VI

2-Phenyladenosine 3',5'-cyclic phosphate (7)

A mixture of 2.0 g (6.3 mmole) of compound 1, 0.7 g (7 mmole) $Et_3N$, 0.30 g 10% Pd/C, 0.8 ml (7.9 mmole) benzaldehyde, and 30 ml 50% aq EtOH was refluxed for 16 hr. The filtered solution was evaporated, and the residue was taken up in 50 ml water. Adjustment of the pH to 2.0 with HCl caused crystallization of the product (0.55 g, 20%).

Anal. Calcd for $C_{16}H_{16}N_5O_6P \cdot H_2O$: C, 45.39; H, 4.29; N, 16.55. Found: C, 45.43; H, 4.38; H, 16.57.

EXAMPLE VII 2-(2-Pyridyl)adenosine 3',5'-Cyclic Phosphate (8)

A mixture of 0.32 g (1 mmole) of compound 1, 0.154 g (1 mmole) DBU, 10 ml $H_2O$, 10 ml MeOH, 0.100 g 10% Pd/C, and 1.28 g (1.2 mmole) pyridine-2-carboxaldehyde was refluxed 1 hr. then filtered and evaporated. The crystals collected after adjustment of the pH of the solution to 2 were recrystallized from $H_2O$ to give 0.270 g (66%) of compound 8.

Anal. Calcd for $C_{15}H_{15}N_6O_6P$: C, 44.34; H, 3.72; N, 20.69 Found: C, 44.42; H, 4.32; N, 20.43.

EXAMPLE VIII 2-(2-Chlorophenyl) adenosine 3',5'-cyclic phosphate (9)

A solution of 1.0 g (3 mmole) of 5-amino-1-β-D-ribofuranosylimidazole-4-carboxamidine 3',5'-cyclic phosphate (1), 1.5 ml 2 N NaOH, 5 ml $H_2O$, 15 ml DMF, and 1 ml o-chlorobenzaldehyde was stirred 3 hr, and then a solution of 1 g chloranil in 10 ml DMF was added. After 1 hr additional stirring, the solution was evaporated and partitioned between 100 ml ethyl acetate and 100 ml water. The aqueous phase was diluted with 100 ml ethanol and passed through a column of 150 ml Dowex 50 × 2 (100–200 mesh, H+ form), which was further eluted with 50% aqueous methanol. Evaporation of product-containing fractions and precipitation of the residue from aqueous ethanol with ether gave 1.06 g (81%) product.

EXAMPLE IX

2-Hydroxyadenosine 3',5'-cyclic phosphate (10)

A mixture of 2.0 g (6.3 mmole) of compound 1, 0.80 g (6.45 mmole) 1,5-diazabicyclo[4.3.0]non-5-ene (DBN), and 10 ml $Me_2SO$ was brought to solution by heating. To this was added, with stirring at 25°, 1.0 g (6.2 mmole) 1,1'-carbonyldiimidazole. After 30 min. stirring another 1.0 g of 1,1'-carbonyldiimidazole was added, and stirring was continued an additional 30 min. The solution was diluted with 50 ml $H_2O$, and 1 ml formic acid and passed through a 2.6 × 10 cm column of Dowex 1 × 2 (formate form, 100–200 mesh). After washing with $H_2O$, the column was eluted with a gradient of 1 liter $H_2O$ in the mixing chamber and 1 liter 5N formic acid in the reservoir. Evaporation of fractions containing product, which appeared between 750 and 1250 ml of eluate, gave 0.79 g (33%).

Anal. Calcd for $C_{10}H_{12}N_5O_7P \cdot 2H_2O$: C, 31.50; H, 4.23; N, 18.37. Found: C, 31.42; H, 4.29; N, 18.44.

EXAMPLE X

2-Thioadenosine 3',5'-cyclic phosphate (11)

A mixture of 3.6 g (11.3 mmole) of compound 1, 1.60 g (10.5 mmole) DBU and 50 mmole DMSO was brought to solution by heating, then was cooled to 0°. With stirring, 2.0 g (11.3 mmole) 1,1'-thiocarbonyldiimidazole was added. After 10 min stirring, the solution was stored at —20° for 20 hr, then an additional 1.0 g 1,1'-thiocarbonyldiimidazole was added. After 30 min stirring at ambient temperature, the solution was diluted with 100 ml $H_2O$ and 1 ml formic acid, then passed through a 2.6 × 20 cm column of Dowex 1 × 2 (formate form, 100–200 mesh). The column was washed with $H_2O$, then eluted with a gradient of 900 ml 1N formic acid in the reservoir. The product began to appear near the end of the gradient, and elution of the product was completed with 1N formic acid + 2N ammonium formate. Fractions containing product were passed through a column containing 1 L. of Dowex 50 × 8 (H+, 100–200 mesh). Evaporation of the eluate to dryness gave 2.05 g (48%) of product.

Anal. Calcd for $C_{10}H_{12}N_5O_6PS \cdot H_2O$: C, 31.58; H, 3.71; N, 18.42. Found: C, 31.87; H, 3.59; N, 18.58.

EXAMPLE XI

2-Methylthioadenosine 3',5'-Cyclic Phosphate (12)

A mixture of 1.8 g (4.5 mmole) of compound 10, 5 ml 2N NaOH, 2 ml MeI, 20 ml $H_2O$, and 20 ml MeOH was stirred 2 hr. The solution was evaporated in vacuo, taken up in 100 ml $H_2O$ and passed through a column of 50 ml Dowex 1 × 2 (formate, 100–200 mesh). The product appeared as the major component upon elution with a gradient of 1 liter 1 N formic acid in the mixing chamber and 1 liter 5 N formic acid in the reservoir. To remove a trace of impurity, the product, isolated after evaporation of the above fractions, was taken up in water and passed onto a 200 ml column of Dowex 50 × 2 (H+, 100–200 mesh), which was washed in the 500 ml water, then 1 liter 0.5 N formic acid. Fractions containing product were evaporated, giving 0.64 g (38%).

Anal. Calcd for $C_{11}H_{14}N_5O_6PS \cdot 1½H_2O$: C, 32.84; H, 4.26; N, 17.41. Found: C, 32.98; H, 4.57; N, 17.49.

The ultraviolet spectra data for the compounds of the foregoing Examples I through X are set forth in Table I which follows.

TABLE I
ULTRA VIOLET SPECTRA OF THE 2-SUBSTITUTED ADENOSINE 3',5'-CYCLIC PHOSPHATES

| No. | 2-Substituent | $\lambda_{max}$ ($\epsilon \times 10^{-3}$) nm | | |
|---|---|---|---|---|
| | | pH 1 | pH 7 | pH 11 |
| 2 | —CH$_3$ | 256 (13.5) | | 261 (14.4) |
| 3 | —C$_2$H$_5$ | 256 (13.9) | | 261 (15.0) |
| 4 | —CF$_3$ | 258 (12.9) | | 258 (13.3) |
| 7 | —C$_6$H$_5$ | 270 (16.5) | | 238 (24.3) |
| 5 | —n—C$_4$H$_9$ | 287 sh(13.7) 257 (14.5) | | 268 sh(14.4) 261 (15.6) |
| 6 | —i—C$_4$H$_9$ | 257 (14.9) | | 261 (15.1) |
| 8 | —2—C$_5$H$_4$N | 232 (16.7) | | 231 (22.4) |
| 9 | —OH | 263 (12.4) 329 (8.6) 234 (6.7) | 247 (9.6) | 261 (13.6) 294 (10.4) 252 (7.3) |
| 10 | —SH | 280 (12.7) 231 (15.1) | 292 (11.9) 229 (16.4) | 283 (10.9) 241 (21.4) |
| 11 | —SCH$_3$ | 288 (21.6) 268 (16.7) | 286 (20.6) | 283 (16.7) 234 (21.8) 272 (14.7) |

EXAMPLE XII

2-Azaadenosine 3',5'-cyclic phosphate (14)

5-Amino-1-β-D-ribofuranosylimidazole-4-carboximidine 3',5'-cyclic phosphate (1.5 g, 4.2 mmole) was dissolved in 92 ml of 6N hydrochloric acid (at −25°C), and sodium nitrite (370 mg, 6.2 mmole) in 14 ml water was added with stirring over a 25 minute period. The solution was stirred at −25°C for a further 40 minutes and ethanol (30 ml was added. The pH of the solution was adjusted to 7 with conc. ammonium hydroxide. The solution was warmed slowly to 0°C and inorganic salts removed by filtration. The filtrate was passed through a Dowex 50 (H+, 100–200 mesh, 5.5 × 46 cm) column and washed with water to remove impurities and then product. Co-evaporation of the appropriate fractions with ethanol gave, after filtration, 1.19 g of 2-azaadenosine 3',5'-cyclic phosphate (dried over P$_2$O$_5$ at 78°C under high vacuum for 18 hrs.)

Anal. Calcd for C$_9$H$_{11}$N$_6$O$_6$P: C, 32.73; H, 3.35; N, 25.45. Found: C, 32.54; H, 3.47; N. 25.23.

$\lambda_{max}^{pH\ 1}$ 252 nm ($\epsilon$7,100), 281 nm ($\epsilon$3,400)
$\lambda_{max}^{pH\ 11}$ 255 nm ($\epsilon$7,100), 296 nm ($\epsilon$5,200)
$\lambda_{max}^{MeOH}$ same as pH 11

EXAMPLE XIII

2-Azainosine 3',5'-cyclic phosphate (15)

5-Amino-1-β-D-ribofuranosylimidazole-4-carboxamide 3',5'-cyclic phosphate (338 mg, 1 mmole) was dissolved in 20 ml 6N hydrochloric acid (at −25°C), and sodium nitrite (80 mg, 1.15 mmole) in 3 ml water was added dropwise with stirring over a 10 minute period. The solution was stirred at −30°C for additional 30 minutes and ethanol (for an ml) was added. The pH of the solution was adjusted to 7 with conc. ammonium hydroxide and the solution added to a Dowex 50 (H+, 100–200 mesh, 3 ×20 cm) column. Elution of the column with water and evaporation of the appropriate fractions gave a semi-solid which crystallized from ethanol, yield 160 mg of 2-azainosine 3',5'-cyclic phosphate.hemi-hydrate (after drying over P$_2$O$_5$, 78°C under high vacuum).

Anal. Calcd for C$_9$H$_{10}$N$_5$O$_7$P 1/2 H$_2$O: C, 31.77; H, 3.25; N, 20.5. Found: C, 31.79; H, 3.23; N, 20.55.

$\lambda_{max}^{pH\ 1}$ 206 nm ($\epsilon$15,400), 237 sh ($\epsilon$5,400), 285 nm ($\epsilon$7,500), 337 nm ($\epsilon$1,000)
$\lambda_{max}^{pH\ 11}$ 247 nm ($\epsilon$5,400), 292 nm ($\epsilon$5,900), 330 sh ($\epsilon$1,000)

EXAMPLE XIV 2-azaadenosine 3',5'-cyclic phosphate-N$^1$-oxide (16)

5-Amino-1β-D-ribofuranosylimidazole-4-carboxamidoxime 3',5'-cyclic phosphate (5 g, 15 mmole) was dissolved in 50 ml of 6N hydrochloric acid (at −30°C), and sodium nitrite (1.14 g, 16.5 mmole) in 5 ml of water was added dropwise with stirring over a 10 minute period. The solution was stirred for an additional 30 minutes at −30°C and then 20 ml of ethanol was added and the pH of the solution adjusted to 7 with conc. ammonium hydroxide. The solution was desalted with Dowex 50 (H+, 100–200 mesh) and co-evaporated with ethanol and filtered, yield: 2.0 g of 2-azaadenosine 3',5'-cyclic phosphate monohydrate (after drying 12 hr over P$_2$O$_5$, 78°C under high vacuum).

Anal. Calcd for C$_9$H$_{11}$N$_6$O$_7$P.H$_2$O: C, 29.68; H, 3.59; N, 23.07. Found: C, 29.51; H, 3.42: H, 22.80.

U.V. $\lambda_{max}^{pH\ 1}$ 222 nm ($\epsilon$25,400), 243 nm ($\epsilon$14,700), 270 sh nm ($\epsilon$4,700), 327 nm ($\epsilon$5,800)
$\lambda_{max}^{pH\ 11}$ 227 nm ($\epsilon$17,700), 245 nm ($\epsilon$13,100), 270 sh nm ($\epsilon$4,200), 350 nm ($\epsilon$5,100)
$\lambda_{max}^{H_2O}$ 222 nm ($\epsilon$25,600 ), 244 nm ($\epsilon$15,600), 270 sh nm ($\epsilon$4,700), 347 nm ($\epsilon$5,500)

EXAMPLE XV

INHIBITION OF PHOSPHODIESTERASE ENZYME

3',5'-cyclic AMP Phosphodiesterase (PDE) has been isolated and purified from different tissues. in the following manner. Homogenates of rabbit lung and kidney, and beef heart were made in sucrose-Tris-magnesium buffer and were subjected to centrifugation at low speed to remove nuclei and cell debris. The supernatants were then centrifuged at 105,000x g for 30 minutes. The 105,000x g supernatants were then fractionated using (NH$_4$)$_2$SO$_4$. The precipitation which formed at 0-30% saturation was collected by centrifugation at 20,000x g and dissolved in Tris-magnesium buffer and dialyzed overnight against the same buffer. A second (NH$_4$)$_2$SO$_4$ fraction was obtained by raising the concentration of the first supernatant to 50%. These two (NH$_4$)$_2$SO$_4$ fractions as well as the supernatant from the 30–50% cut were then assayed for PDE activity using the method of Appleman, *Biochemistry*, 10, 311 (1971). The first fraction obtained from lung and kidney tissues was found to contain a PDE with low affinity for 3',5'-cyclic AMP (high Km). The second fraction was found to exhibit a biphasic curve when the Lineweaver-Burk method of analysis was used. This indicates either the presence of two separate enzymes, one having a high and the other a low affinity for the enzymes, or one protein with two separate sites. Appleman, supra, indicates that extracts of brain yield two separate enzymes (a high Km and a low Km) which can be separated by sepharose gel chromatography.

All of the inhibitory studies reported here were performed with the high affinity (Fraction II, low Km) enzyme obtained from rabbit lung and kidney or beef heart. $I_{50}$ values were calculated in some instances from a plot of log I vs. percent I in experiments in which inhibitor concentration was varied over a wide range, at a constant 3',5'-cyclic AMP concentration of approximately $1.7 \times 10^{-7}$ M. The relative inhibitory activity of each compound as compared with theophylline is expressed as an $\alpha$ value. This value is obtained by dividing the $I_{50}$ value obtained for the particular compound being evaluated into the $I_{50}$ of theophylline. In most instances $\alpha$ values were calculated from an inhibition study performed with a single concentration of test compound as long as the inhibition produced by that concentration was from 20–80%. In this instance an $\alpha$ value was calculated by dividing the concentration of theophylline giving the same (X%) inhibition.
concentration of test substance giving x% inhibition.

The validity of this method has been checked by comparing values obtained by (1) measurements at a single concentration of inhibitor and (2) measurements at several concentrations of inhibitor ($I_{50}$ determinations). $\alpha$ values compared in this way have been found to agree to within 10% of each other.

The basic incubation mixture contained the following substances (amounts in mmoles): $^3$H-cAMP (specific activity ~2,180 cpm/pmole), 00016; Tris pH 7.5; 40; $MgCl_2$, 0.5; Enzyme (cAMP phosphodiesterase), 5–50 μg protein; and $10^{-4}$ to $10^{-6}$ molar concentration of the inhibitor; incubation time 10 minutes at 30°C. At the end of incubation the mixtures are heated to 90°C for 2 minutes and 100 μg of snake venom phosphodiesterase from Crotalus atrox was added and the tubes incubated for 10 minutes at 30°C. The mixture was then cooled and 1 ml of a Dowex 1-2X, 200–400 mesh suspension, prepared by mixing 100 g of the resin in 200 g $H_2O$, was added and the mixture centrifuged. An aliquot of the supernatant was used to determine counts per minute using a liquid scintillation counter. Zero time values were obtained using incubations in which the cAMP phosphodiesterase was omitted from the first incubation.

The inhibition results, along with the protein kinase, adenyl cyclase and adrenyl steriodogenesis activity and phosphodiesterase degradation resistance, are set forth in Table II.

EXAMPLE XVI

ACTIVATION OF BOVINE BRAIN PROTEIN KINASE

Cyclic AMP-dependent protein kinase was purified to the stage of DEAE cellulose chromatography from bovine brain using the procedure of Miyamoto et al., *J. Biol. Chem.* 224, 6395 (1969). Protein kinase activity was assayed by measuring the incorporation of $^{32}$P-phosphate into histone from $\gamma$-$^{32}$P labeled ATP. The incubation mixture contained (amounts in μmole): sodium glycerol phosphate buffer, pH 6, 10; $\gamma$-$\mu^{32}$P-ATP, ~2 × $10^6$ cpm, 0.001; magnesium acetate, 2; sodium fluoride, 2; EDTA, 0.06,; histone, 40–400 μg; cAMP, cGMP or analog as indicated; purified protein kinase, 5–25 μg in a final volume of 0.2 ml. Activation constants (ka) were determined according to the procedure of Muneyama et al., infra. The Ka values relative to cyclic AMP (Ka') are reported in Table I.

EXAMPLE XVII

RESISTANCE TO PHOSPHODIESTERASE (PDE) DEGRADATION

The cyclic AMP phosphodiesterases used were ammonium sulfate precipitates of 100,000x g supernatants prepared from tissue homogenates of rabbit kidney. The ability of the analogs to serve as substrates for the cAMP phosphodiesterase was measured by the previously described method of Muneyama et al., Biochemistry 10, 2390 (1971). Inorganic phosphate, released from the 5'-monophosphate formed upon treatment of the analog with PDE was determined colorimetrically. The inorganic phosphate release was effected with snake venom 5'-nucleotidase or *E. coli* alkaline phosphatase. The basic mixture contained the following (amounts in μmoles): Tris buffer, pH 7.5, 40; magnesium acetate, 25; cAMP or analog, 0.1; enzyme, 100–500 μg in a final volume of 1.0 ml. One unit of activity was defined as that amount of enzyme catalyzing the hydrolysis of 1.0 μmole in 10 minutes at 37°C. Table I reports rates of analog hydrolysis relative to cyclic AMP ($\alpha$).

EXAMPLE XVIII

ACTIVATION OF ADRENAL STEROIDOGENESIS

Suspensions of rat adrenal cells were prepared by the general technique of Kloppenborg et al, *Endocrinology* 82, 1053, (1968). Decapsulated adrenal quarters from male Sprague-Dawley rates were suspended in a buffer of Krebs-Ringer bicarbonate-albumin-glucose (KRBAG) pH 7.4) prepared according to DeLuca and Cohen (1964) in Manometric Techniques, 4th ed, Umbreit, W. W., Burris, R. H., and Stauffer, J. F., Ed., Minneapolis, Minn., Burgess, pp 132–133. and containing bovine albumin (3 g/100 ml) and glucose (0.2 g/100 ml). Collagenase (5 mg/ml) was added to quarters of 32 adrenals in 10 ml of KRBAG. The tissue was digested for 1 hour at 35°, under 95% $O_2$-5% $CO_2$, in a New Brunswick gyrotory bath oscillating at 120 cycles/min. After digestion, the tissue was gently dispersed by repeated passage through a Pasteur pipet. The suspended cells were collected by centrifugation at 4° for 10 min. at 480 g, followed by two cycles of washing and recentrifugation in the original volune of KRBAG. The washed cell pellet was then resuspended in KRBAG (1 adrenal/ml) and filtered through a stainless steel sieve with perforations of 0.2 mm, in order to remove any large particles of undigested tissue.

Incubations were conducted at 35° for 2 hours, under 95% $O_2$-5% $CO_2$. Each 2.5 ml incubation mixture contained 1 ml of adrenal cell suspension.

EXAMPLE XIX

Assay for Adenyl Cyclase Activity

Lung alveolar tissue was obtained from normal guinea pigs. The tissue was minced and a Duall tissue grinder was used to prepare a 20% homogenate in chilled buffer containing 1 mM MgCl₂ and 2 mM glycylglycine, pH 7.5 (F. Murad et al., J. Biol. Chem. 237: 1233, 1962). The homogenate was strained through four layers of gauze and centrifuged at 1000×g for 15 min at 4°. The pellet was resuspended in the original volume of buffer and recentrifuged. The pellet was again resuspended in buffer and 0.5–1.0 ml aliquots were sealed in ampoules and stored under liquid nitrogen for future assay of adenylate cyclase activity. Samples stored in this manner exhibited undiminished activity for as long as 3 months. Protein was determined by the method of Lowry et al., J. Biol. Chem. 193: 265, 1951, with crystalline bovine serum albumin as standard.

Adenylate cyclase activity was assayed in duplicate by a modification of previously published methods (G. Krishna et al., J. Pharmacol. Exp. Therap. 163: 379, 1968; G. S. Levey and S. E. Epstein, Circ. Res. 24: 151, 1969). The total assay volume was 0.59 ml and contained 1.8 mM MgCl₂, 0.8 mM glycylglycine, 32 mM Tris (pH 7.8), 1.2 mM ATP, 3–5×10⁶ cpm [α-$^{32}$P] ATP, and particulate enzyme fraction (100–150 μg. lung protein). Concentrated solution of compounds to be tested were prepared fresh daily by dissolution in water, ethanol, or dimethyl sulfoxide; 5–10 μl of the solution was added to the incubation mixture to give the desired final concentration. Control assays (without compound) contained solvent alone.

The incubation mixture was reacted for 15 min at 37° in a shaker, and then boiled for 3 min to inactivate the cyclase. One hundred μl of a solution containing 4 μmoles ATP, 1.25 μmoles cyclic AMP, and 0.15 μCi [³H] cyclic AMP was added to the reaction mixture. The denatured enzyme was sedimented by centrifugation and the supernatant applied to a Dowex 50W-X8 (100–200 mesh) column of approximately 1 cm³ bed volume. The column was eluted with water and the first 3 ml collected were discarded except for the blank (no enzyme) assays, for which this fraction provided an accurate measure of the (radio-active) ATP added. The next 4 ml eluted contained 55–70% of the total cyclic AMP present. This fraction was treated with 0.5 ml of 0.18 M ZnSO₄ followed by 0.5 ml of an equivalent Ba(OH)₂ solution. The resulting precipitate was spun down and the ZnSO₄—Ba(OH)₂ treatment repeated without disturbing the first precipitate. After centrifugation, 1 ml of supernatant containing [$^{32}$P] cyclic AMP and [³H] cyclic AMP was mixed with 15 ml of scintillator (100 g naphthalene, 14 g PPO, and 0.1 g dimethyl POPOP per 2 l dioxane) and counted. The amount of [$^{32}$P] cyclic AMP formed in each assay was corrected for recovery losses subsequent to the incubation with the aid of the [³H] cyclic AMP found in each case. Activities are reported in Table II as I/50 values, ie, concentration required for 50% enzyme inhibition.

TABLE II

| Compound | Substrate α (kidney) | Phosphodiesterase Inhibition α | | | Protein Kinase Ka' | Adrenal Steriodogensis* A₅₀,μm | Adenyl Cyclase** T/C |
|---|---|---|---|---|---|---|---|
| | | Lung | Kidney | Heart | | | |
| 2 | 0.83 | 129 | | | 0.08 | 6000 | 1.08 |
| 4 | 0.40 | 120 | | | 0.25 | 3800 | |
| 5 | 0.64 | 66.5 | | 10.7 | 0.46 | 7200 | 0.95 |
| 6 | 0.66 | 2.7 | | 1.0 | 0.003 | | |
| 7 | 0.32 | 48.5 | | 6.9 | 0.024 | 850 | 0.62 |
| 8 | 0.76 | 13.0 | | 0.9 | 0.009 | | |
| 10 | 0.66 | 2.7 | | 1.0 | 0.056 | | |
| 11 | 0.15 | 23.6 | | 29.7 | 0.001 | >10000 | 0.41 |
| 12 | 0.55 | 2.7 | | 22.5 | 0.20 | | |
| 14 | 0.99 | 26.0 | 10.0 | 4.5 | 0.075 | >10000 | 0.69 |
| 15 | | | | | 0.11 | | |
| 16 | 0.30 | 2.0 | 2.0 | 0.8 | 0.08 | 3200 | 1.03 |

*Adrenal Steriodogenesis cAMP, A₅₀ = 3300μm.
**T/C is the ratio of picomoles of cyclic 3',5' AMP formed/milligram of enzyme protein/15 minutes in presence of 1 millimole of compound; the whole divided by the value in the absence of the compound.

Certain of the compounds of this invention have also undergone perliminary pharmacological evaluation. Primary antihypertensive screening in ambulatory spontaneously hypertensive rats of compounds 3, 14 and 16 demonstrated significant depressor activity when tested at a dose of 25 mg/kg for periods of time varying between 1 to 10 hours. Quantative and qualitative primary activity screening on rats in vivo, which indicates preliminarily the presence of CNS or autonomic activity as well as lethality data and analgesic and antimuricidal acitvity, of compounds 2, 14 and 16, when tested intraperitoneally at three to five dose levels between 25 and 200 mg/kg, showed slight activity and a minimum lethal dose of 200 mg/kg. Compounds 2, 3 and 14 were additionally tested to determine in vitro the activity in inhibiting the action of cat heart phosphodiesterase enzyme on cyclic AMP. All three compounds showed marked activity, inhibiting by 50% the action of the enzyme at concentrations of 0.39, 1.4 and 2.7 micromolar respectively. Additionally, compounds 2, 5 14 and 16 were also found to lower significently rat blood pressure when administered at a concentration of 25 mg/kg of rat weight, while compound 11 also lowered rat blood pressure when administered at a concentration of 50 mg/kg of rat weight.

In light of the foregoing description of the preferred embodiments of the invention, variations within the spirit and scope of the same will be apparent to those skilled in the art. For example, the cyclic nucleotides of this invention may be employed in the form of their physiologically acceptable salts, as for example, ammonium alkali metal and alkyl amine salts, obtained by neutralization of the free nucleotide with bases appropriate to the desired end. The 2'-O-acylated (e.g., $C_1$-$C_{16}$ acyl) analogs may be secured by reaction of the free nucleotides or salts thereof with corresponding acid anhydrides or acyl halides, e.g., acetic anhydride, acetyl chloride, propionyl chloride, propionic anhydride, butyric anhydric, butyryl chloride, valeryl chloride, valeric anhydride, heptanoic anhydride, heptanoyl chloride, hexanoyl chloride, hexanoic anhydride, oxtanoyl chloride, octanoic anhydride, palmitoyl chloride and palmitic anhydride, etc., in base as described in a general synthesis by Falbriard, et al., Biochim. et Biophys. Acta, 148, 99 (1967). Sutherland et al., Bio-

*chim. et Biophys. Acta*, 148, 106 (1967) have demonstrated that acylation of c-AMP enhanced the biological effect of c-AMP by either increased resistance to phosphodiesterase hydrolysis and/or cellular transport. Hoeksema, et al., *Biochemical and Biophysical Research Communications*, 6, 213 (1961) have shown that the oral absorption pattern of a nucleoside in humans can be enhanced by acetylation of the nucleoside.

It will also be appreciated that additional experimental examples could be given herein of the compounds of this invention, both as to preparation and activity, but will not, for the sake of brevity of disclosure, since the art skilled will readily appreciate and understand the full scope of the invention given the disclosure herein.

We claim:

1. A compound of the structure:

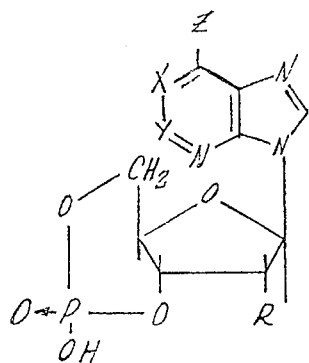

and physiologically acceptable salts thereof, wherein X is N or N-oxide; Y is N or $CR_1$ in which $R_1$ is $C_1$ to $C_8$ alkyl, phenyl, 2-$C_5H_4N$, trihalomethyl, SH or $SR_2$ where $R_2$ is $C_1$ to $C_8$ alkyl or arralkyl; Z is $NH_2$ or OH: and R is H, OH or OR' where R' is $C_1$ to $C_{18}$ acyl; provided that Z is OH only when X and Y are N, and X is N-oxide only when Y is N and Z is $NH_2$.

2. The compound of claim 1 in which X is N, Z is $NH_2$ and Y is $CR_1$.

3. The compound of claim 1 in which $R_1$ is $C_1$ $C_6$ alkyl.

4. The compound of claim 1 in which $R_2$ is $C_1$ to $C_6$ alkyl.

5. The compound of claim 1 in which X and Y are N.

6. The compound of claim 5 in which Z is NH.

7. A process of synthesizing 2-substituted derivatives of cyclic AMP comprising condensing 5-amino-1-β-D-ribofuranosylimidazole-4-carboxamidine 3',5'-cyclic phosphate with a carboxaldehyde selected from the group consisting of alkyl, aryl, aralkyl and pyridyl carboxaldehyde in refluxing alcohol to provide the corresponding 2-substituted adenine derivative.

8. The process of claim 7 in which the carboxaldehyde is a $C_1$ to $C_8$ alkyl carboxaldehyde and condensation occurs in refluxing ethanol for from about 5 minutes to approximately 1 hour.

9. The process of claim 7 in which the carboxaldehyde is benzaldehyde and condensation occurs in refluxing ethanol for from about 5 minutes to about 1 hour.

10. The process of claim 7 in which the carboxaldehyde is pyridine-2-carboxaldehyde and condensation occurs in refluxing ethanol for from about 5 minutes to about 1 hour.

11. A process of synthesizing 2-substituted derivatives of cyclic AMP comprising condensing 5-amino-1-β-D-ribofuranosylimidazole-4-carboxamidine 3',5'-cyclic phosphate with a carboxaldehyde selected from the group consisting of alkyl, aryl, aralkyl and pyridyl carboxaldehyde in an aqueous organic water-miscible solvent, and reacting such condensation product with a dehydrogenation reagent to provide the corresponding 2-substituted adenine derivative.

* * * * *